(12) United States Patent
Tatsuno

(10) Patent No.: US 8,717,671 B2
(45) Date of Patent: May 6, 2014

(54) PROJECTION OPTICAL SYSTEM AND IMAGE PROJECTION DEVICE

(75) Inventor: Hibiki Tatsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 13/312,264

(22) Filed: Dec. 6, 2011

(65) Prior Publication Data

US 2012/0162753 A1    Jun. 28, 2012

(30) Foreign Application Priority Data

Dec. 27, 2010 (JP) ................................. 2010-290068

(51) Int. Cl.
*G02B 17/08* (2006.01)
(52) U.S. Cl.
CPC .................................. *G02B 17/0816* (2013.01)
USPC .......................................... 359/364; 359/654
(58) Field of Classification Search
None
See application file for complete search history.

(56) References Cited

U.S. PATENT DOCUMENTS

| | | | |
|---|---|---|---|
| 6,856,438 B2 | 2/2005 | Takanashi et al. |
| 6,924,938 B2 | 8/2005 | Nishina et al. |
| 7,031,074 B2 | 4/2006 | Nishina et al. |
| 7,048,388 B2 | 5/2006 | Takaura et al. |
| 7,064,902 B2 | 6/2006 | Nishina et al. |
| 7,164,541 B2 | 1/2007 | Nishina et al. |
| 7,507,942 B2 | 3/2009 | Tatsuno |
| 7,527,394 B2 | 5/2009 | Tatsuno |
| 7,549,755 B2 | 6/2009 | Suzuki |
| 7,589,307 B2 | 9/2009 | Tatsuno |
| 7,810,931 B2 | 10/2010 | Kawamura et al. |
| 2009/0168031 A1 | 7/2009 | Imaoka et al. |

FOREIGN PATENT DOCUMENTS

| | | |
|---|---|---|
| JP | 2003-262807 | 9/2003 |
| JP | 2006-235516 | 9/2006 |
| JP | 4210314 | 10/2008 |
| JP | 2009-157223 | 7/2009 |

OTHER PUBLICATIONS

U.S. Appl. No. 13/315,679, filed Dec. 9, 2011, Tatsuno.

*Primary Examiner* — Derek S Chapel
(74) *Attorney, Agent, or Firm* — Oblon, Spivak, McClelland, Maier & Neustadt, L.L.P.

(57) ABSTRACT

A projection optical system for projecting an image on a surface is provided. The image is an enlarged image of an image which is formed on an image forming element. The projection optical system includes a coaxial optical system having an optical axis; and a non-coaxial optical system including a rotationally asymmetric curved-surface mirror. The non-coaxial optical system does not share the optical axis with the coaxial optical system. The coaxial optical system includes a first lens having a positive refractive power and being an aspheric plastic lens; and a second lens having a negative refractive power and being an aspheric plastic lens. The first lens has a first refractive index distribution, and the second lens has a second refractive index distribution.

20 Claims, 15 Drawing Sheets

PROJECTION OPTICAL SYSTEM AND IMAGE PROJECTION DEVICE

BACKGROUND OF THE INVENTION

1. Field of the Invention

An aspect of this disclosure relates to a projection optical system and an image projection device including the projection optical system.

2. Description of the Related Art

Recently, for a liquid-crystal projector that is widely known as an image projection device, a resolution improvement of a liquid-crystal panel, an improvement on brightness based on an efficiency improvement of a light-source lamp, and a price reduction are progressing. Further, small and light weight image projection devices that utilize DMD (Digital Micro-mirror Device) and the like become common, and the image projection devices are widely used not only in offices or schools, but also in households. Especially, as portability of front projectors are improved, front projectors are used for small conferences for several people. As a projection optical system to be mounted in such an image projection device, a projection optical system including a curved-surface mirror has been proposed (for example, cf. Patent Document 1 (Japanese Published Unexamined Application No. 2006-235516), Patent Document 2 (Japanese Registered Patent No. 4210314), and Patent Document 3 (Japanese Published Unexamined Application No. 2009-157223)).

SUMMARY OF THE INVENTION

In one aspect, there is provided a projection optical system for projecting an image on a surface to be projected, the image being an enlarged image which is formed on an image forming element. The projection optical system includes a coaxial optical system having an optical axis; and a non-coaxial optical system including a rotationally asymmetric curved-surface mirror. The non-coaxial optical system does not share the optical axis with the coaxial optical system. The coaxial optical system and the non-coaxial optical system are arranged in this order on a light path from the image forming element to the surface. The coaxial optical system includes at least a first lens having a positive refractive power and being an aspheric plastic lens; and a second lens having a negative refractive power and being an aspheric plastic lens. The first lens has a first refractive index distribution along a first direction from the center of the first lens to a peripheral portion of the first lens, and the second lens has a second refractive index distribution along a direction from the center of the second lens to a peripheral portion of the second lens. One of the first lens and the second lens is arranged at a position closest to the curved-surface mirror among the optical elements included in the coaxial optical system.

In another aspect, there is provided a projection optical system for projecting an image on a surface to be projected, the image being an enlarged image which is formed on an image forming element. The projection optical system includes a coaxial optical system having an optical axis; and a non-coaxial optical system including a rotationally asymmetric curved-surface mirror. The non-coaxial optical system does not share the optical axis with the coaxial optical system. The coaxial optical system and the non-coaxial optical system are arranged in this order on a light path from the image forming element to the surface. The coaxial optical system includes at least a group of lenses including a first lens and a second lens. The first lens has a first refractive power, a surface of the first lens close to the image forming element being an aspheric surface, and a surface of the first lens close to the curved-surface mirror being a spherical surface. The second lens has a second refractive power, a surface of the second lens close to the image forming element being a spherical surface, and a surface of the second lens close to the curved-surface mirror being an aspheric surface. The spherical surface of the first lens and the spherical surface of the second lens are joined. The first lens has a first refractive index distribution along a first direction from the center of the first lens to a peripheral portion of the first lens, and the second lens has a second refractive index distribution along a second direction from the center of the second lens to a peripheral portion of the second lens. The second lens is arranged at a position closest to the curved-surface mirror among the optical elements included in the coaxial optical system.

In another aspect, there is provided an image projection device including an image forming element that forms an image thereon in accordance with a modulated signal; and a projection optical system that irradiates light from a light source to the image forming element and projects an image on a surface to be projected, the image being an enlarged image which is formed on the image forming element. The projection optical system includes a coaxial optical system having an optical axis; and a non-coaxial optical system including a rotationally asymmetric curved-surface mirror. The non-coaxial optical system does not share the optical axis with the coaxial optical system. The coaxial optical system and the non-coaxial optical system are arranged in this order on a light path from the image forming element to the surface. The coaxial optical system includes, at least, a first lens having a positive refractive power and being an aspheric plastic lens; and a second lens having a negative refractive power and being an aspheric plastic lens. The first lens has a first refractive index distribution along a first direction from the center of the first lens to a peripheral portion of the first lens, and the second lens has a second refractive index distribution along a second direction from the center of the second lens to a peripheral portion of the second lens. One of the first lens and the second lens is arranged at a position closest to the curved-surface mirror among the optical elements included in the coaxial optical system.

Other objects, features and advantages of the present invention will become more apparent from the following detailed description when read in conjunction with the accompanying drawings.

DETAILED DESCRIPTION OF THE PREFERRED EMBODIMENTS

Figure 1:
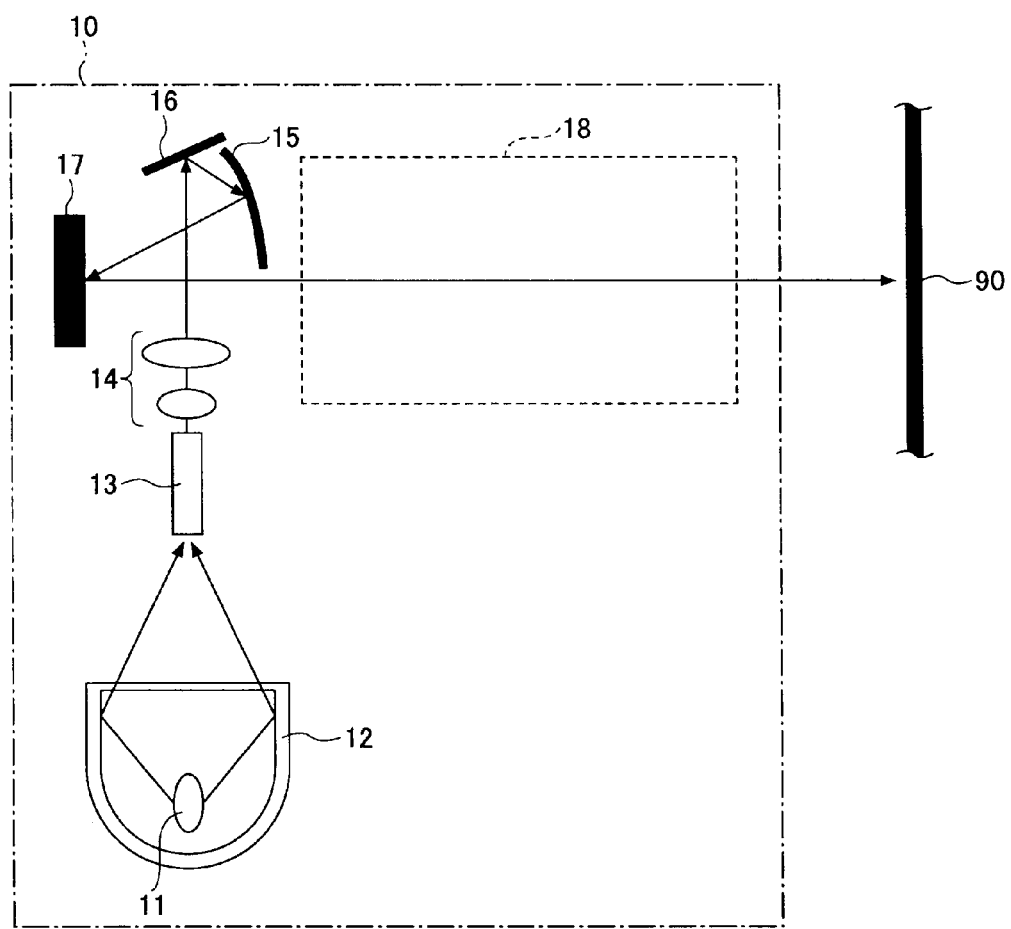
FIG. 1 is a schematic diagram illustrating an image projection device according to a first embodiment.

Hereinafter, for example, a projection optical system in which a free-form surface mirror is adopted as a curved-surface mirror and in which a plastic lens is arranged in the vicinity of the free-form surface mirror is considered. In such a projection optical system, there is a problem that, if an error occurs in the production process of the projection optical system, an uncorrectable deformation occurs in an image projected onto a surface, such as a screen, when a focus adjustment is performed. Among the errors that can occur in the production process, especially, the refractive index distribution that occurs during the shaping process of a plastic lens, which is to be arranged in the vicinity of the free-form surface mirror, can be a cause of field curvature.

However, in conventional projection optical systems including the projection optical systems described in Patent Documents 1-3, errors that occur in actual production processes of the projection optical systems have not been considered. Especially, the refractive index distribution that occurs during the shaping process of the plastic lens has not been considered at all.

Embodiments have been developed in view of the above problem. An objective of the embodiments is to provide a projection optical system for which the refractive index distribution that occurs during the shaping process of the plastic lens is considered and an image projection device including the projection optical system.

Hereinafter, the embodiments are explained with reference to the figures. In the embodiments, same reference numerals may be used for corresponding parts that are common to the embodiments, in order to avoid overlapping explanations. Incidentally, in each embodiment, a long axis direction of a screen (a horizontal direction) is defined to be an X-axis direction, a short axis direction of the screen (a vertical direction) is defined to be a Y-axis direction, and a normal direction of the screen is defined to be a Z-axis direction.

First Embodiment

FIG. 1 is a schematic diagram illustrating an image projection device 10 according to a first embodiment. Schematically, the image projection device 10 shown in FIG. 1 irradiates light emitted from a light source 11 onto an image forming element 17 and projects a magnified image of the image forming element 17 onto a screen 90 using a projection optical system 18. As the light source 11, for example, a halogen lamp, a xenon lamp, a metal halide lamp, an extra high pressure mercury lamp, and an LED can be used. As the image forming element 17, for example, a DMD (Digital Micro-mirror Device) or a liquid crystal panel can be used.

Here, the image projection device 10 is specifically explained. The light emitted from the light source 11 is condensed at an entrance of an integrator rod 13 by a reflector 12. The integrator rod 13 is, for example, a light pipe which is shaped like a tunnel by combining four mirrors. The light condensed at the entrance of the integrator rod 13 repeats reflecting on mirror surfaces on the interior of the integrator rod 13. Thus, the amount of light distribution is uniform at the exit of the integrator rod 13. The exit of the integrator rod 13 may be deemed as a surface light source which emits illuminating light whose light intensity distribution is uniform. An image of the surface light source is formed, for example, on the image forming element 17 through the lenses for illumination 14, a first mirror 15, and a second mirror 16. Since the image forming element 17 is irradiated by the light whose light intensity distribution is uniform, the light intensity distribution over the image projected onto the screen 90, which is the magnified image of the image forming element 17, is also uniform.

When the image forming element 17 is the DMD, the image forming element 17 includes many infinitesimal mirrors. An angle of each infinitesimal mirror can be varied, for example, within a range between minus 12 degrees and 12 degrees inclusive. An angle of the illuminating light toward the DMD may be adjusted, so that, for example, when the angle of the infinitesimal mirror is minus 12 degrees, the illuminating light reflected on the infinitesimal mirror enters the projection optical system 18, and when the angle of the infinitesimal mirror is 12 degrees, the illuminating light reflected on the infinitesimal mirror does not enter the projection optical system 18. In this manner, a digital image can be formed on the screen 90 by controlling the inclination angles of the infinitesimal mirrors included in the DMD.

Incidentally, plural image forming elements 17 corresponding to, for example, red, green, and blue may be used. Further, each image forming element 17 may be irradiated with light which has passed through a corresponding color filter. Then a color image can be projected onto the screen 90, when light fluxes reflected from the plural image forming elements 17 are combined with a light combining unit and the combined light fluxes enter the projection optical system 18.

Figure 2:
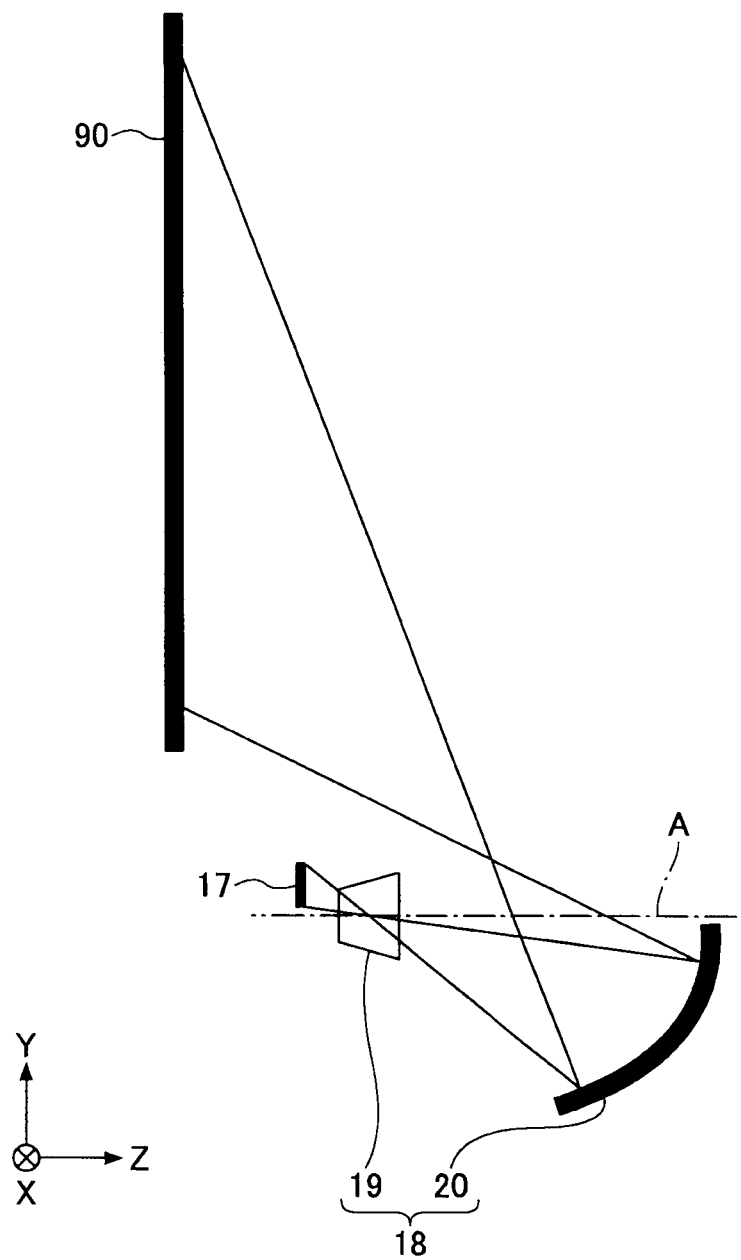
FIG. 2 is a ray diagram schematically illustrating a projection optical system according to the first embodiment.

FIG. 2 is a ray diagram schematically illustrating the projection optical system 18 according to the first embodiment. With reference to FIG. 2, the projection optical system 18 includes a coaxial optical system 19 including lenses having a common optical axis or a group of lenses having a common optical axis, and a curved-surface mirror 20 which is a non-coaxial optical system which does not have a common optical axis with the coaxial optical system 19.

In the projection optical system 18, the coaxial optical system 19 and the curved-surface mirror 20 are arranged in this order on a light path from the image forming element 17 to the screen 90, on which an image is to be projected. The curved-surface mirror 20 is a single rotationally asymmetric curved-surface mirror. Here, the non-coaxial optical system may include an optical element other than the curved-surface mirror 20. Further, the symbol "A" shown in the figures indicates the optical axis of the coaxial optical system 19.

The projection optical system 18 forms an intermediate image (real image) of the image forming element 17 once in between the coaxial optical system 19 and the curved-surface mirror 20, which is the non-coaxial optical system. The projection optical system 18 is an intermediate image system that projects the intermediate image onto the screen 90 by lifting up the intermediate image with the curved-surface mirror 20. A concrete configuration of the coaxial optical system 19 is described later. Hereinafter, an example case is explained in which a free-form surface mirror is used as the curved-surface mirror 20.

Figure 3:
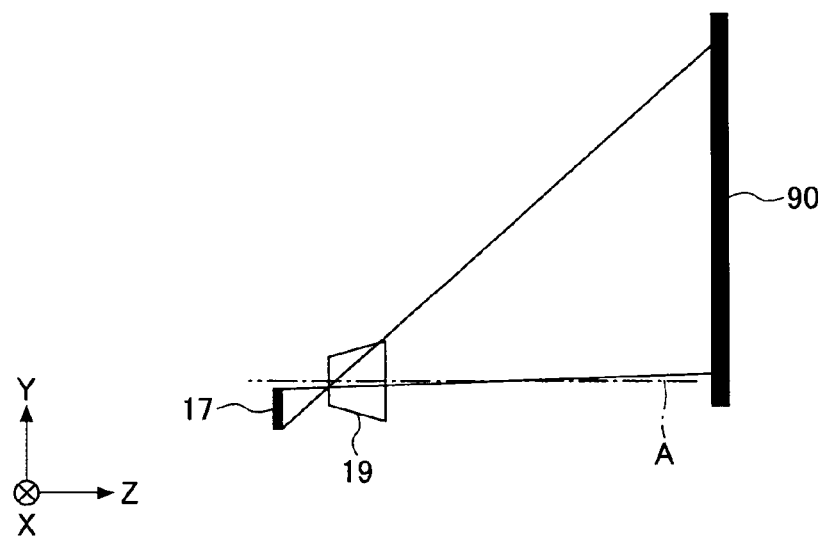
FIG. 3 is a diagram for illustrating a curved-surface mirror.

The curved-surface mirror 20 is further explained in detail below. In order to project the image onto the screen 90 at close range, it may be required to form the image above the image projection device 10, such as a projector, so that the screen can be easily seen. Therefore, as shown in FIG. 3, for example, a center of the image forming element 17 is not placed on the optical axis A of the coaxial optical system 19, but the center of the image forming element 17 is eccentrically placed with respect to the optical axis A. The quality of the image is maintained by taking a wide performance guarantee range of the coaxial optical system 19 (namely, by setting the coaxial optical system 19 to be a wide-angle lens). However, there is a limit for the width, when the coaxial optical system 19 is a wide-angle lens. Thus, in order to project the image from a position closer to the screen 90 using the coaxial optical system 19, it may be required to lengthen the light path using a mirror. This method of lengthening the light path using a mirror has been used for rear-projection televisions. However, it is difficult to use a mirror in a portable image projection device, which is usually used in a meeting room. If such a mirror were used in a portable image projection device, a large mirror might be required as well as a large space and cost. Therefore, the method shown in FIG. 3 is not preferable.

Figure 4:
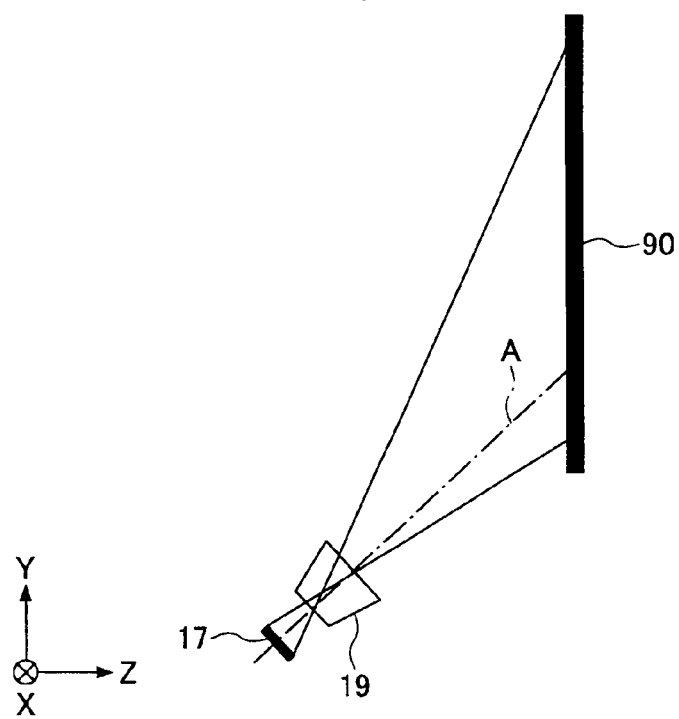
FIG. 4 is a diagram for illustrating the curved-surface mirror.

As an example which is different from that of FIG. 3, there is a method in which an image is projected obliquely using a curved mirror. The oblique projection is, for example, as shown in FIG. 4, to project the image at close range by obliquely arranging the image forming element 17 or the coaxial optical system 19 with respect to the screen 90. With this method, the image can be projected at close range. However, there is a disadvantage that the screen is deformed in a trapezoidal shape. Therefore, the method shown in FIG. 4 is not preferable.

Figure 5:
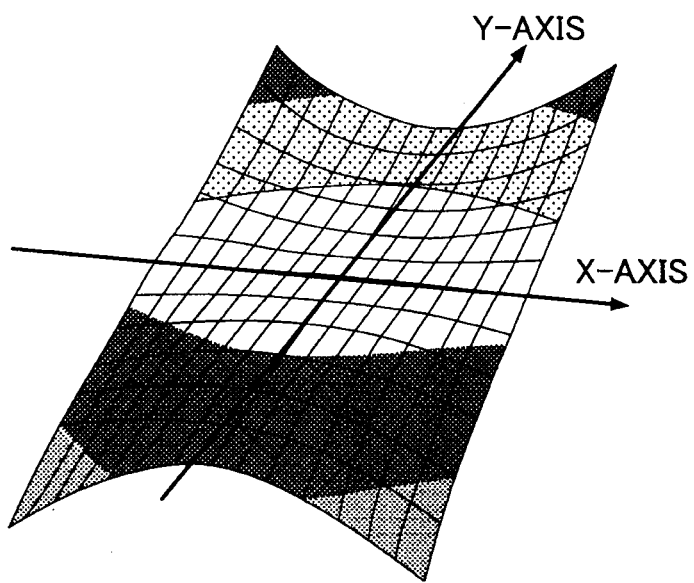
FIG. 5 is a diagram illustrating the curved-surface mirror.

In view of the problems on the methods corresponding to FIGS. 3 and 4, in the embodiment, the optical systems are arranged as shown in FIG. 2. The deformation of the screen in the trapezoidal shape is efficiently corrected by using the free-form surface mirror as the curved-surface mirror 20. Here, the free-form surface mirror is, for example, as shown in FIG. 5, a mirror such that a curvature in the X-axis direction of its surface varies along the Y-axis direction. Specifically, when the vertical direction of the screen 90, on which the image is to be projected, is set to be the X-axis direction and the horizontal direction of the screen 90 is set to be the Y-axis direction, the curvature of the curved-surface mirror 20 in the X-axis direction becomes greater as a coordinate value of the Y-axis varies from a coordinate value corresponding to an end portion of the curved-surface mirror 20 which is closer to the optical axis A of the coaxial optical system 19 to the coordinate value corresponding to another end portion of the curved-surface mirror 20 which is separated from the optical axis A of the coaxial optical system 19.

The projection optical system 18 functions to form the real image of the image forming element 17 on the screen 90. A size of the image to be displayed on the screen 90 and a distance between the image projection device 10 and the screen 90 may be adjusted by a user of the image projection device 10. In order to form the real image of the image forming element 17 on the screen 90, a focus adjustment process is performed. In a projection optical system for a usual projector (namely, in a coaxial optical system which is rotationally symmetric), a whole focusing method or a focus adjusting method, in which one of lenses (or one of groups of lenses, where each group of lenses includes plural lenses) is moved, has been used. Here, in the whole focusing method, the entire projection optical system is moved and the focus is adjusted.

For the projection optical system 18 according to the embodiment, it is preferable to adopt a focus adjusting method in which a lens or a group of lenses that is closest to the image forming element 17 is fixed, while either two or more lenses or two or more groups of lenses are moved in the optical axis direction. Namely, it is preferable that a distance between the lens or the group of lenses that are the closest to the image forming element 17 not be varied. The reason is as follows. Here, the image is projected onto the screen 90 at close range, and the deformation of the image is mainly corrected using the curved-surface mirror 20, which is the non-coaxial optical system. Therefore, if the whole focusing method or the focus adjusting method, in which one lens or one group of lenses are moved, were used, a correction of the amount of deformation would be insufficient.

Additionally, when the lens or the group of lenses which are closest to the image forming element 17 is fixed, brightness does not change depending on the size of the screen, compared to the case when the whole focusing method or the focus adjusting method, in which one lens or one group of lenses are moved, is used. In other words, the reflected light from the image forming element 17 needs to reach the screen 90 (in order to improve the light use efficiency). When the lens or the group of lenses which are the closest to the image forming element 17 are not fixed and moved in the optical axis direction, a portion of the reflected light is scattered by an outer frame of the lens or an outer frame of the group of the lenses. Thus it is not ensured that all the reflected light reaches the screen 90. Here, there would be no problem, if an outer diameter of the lens or the group of lenses which are closest to the image forming element 17 were sufficiently large compared to the diameter of the flux of the reflected light from the image forming element 17. However, it is not preferable to enlarge the diameter of the lens or the group of lenses from the viewpoints of resource saving and downsizing of the products.

Here, when the distance between the projection optical system 18, which is assumed as a product, and the screen 90 is almost constant (for example, when the usage of the projection optical system 18 is limited to a case in which the distance between the projection optical system 18 and the screen 90 is 500 mm plus/minus 5 mm), the whole focusing method or the focus adjusting method, in which one lens or one group of lenses are moved, can be adopted without any problem.

Figure 6A:
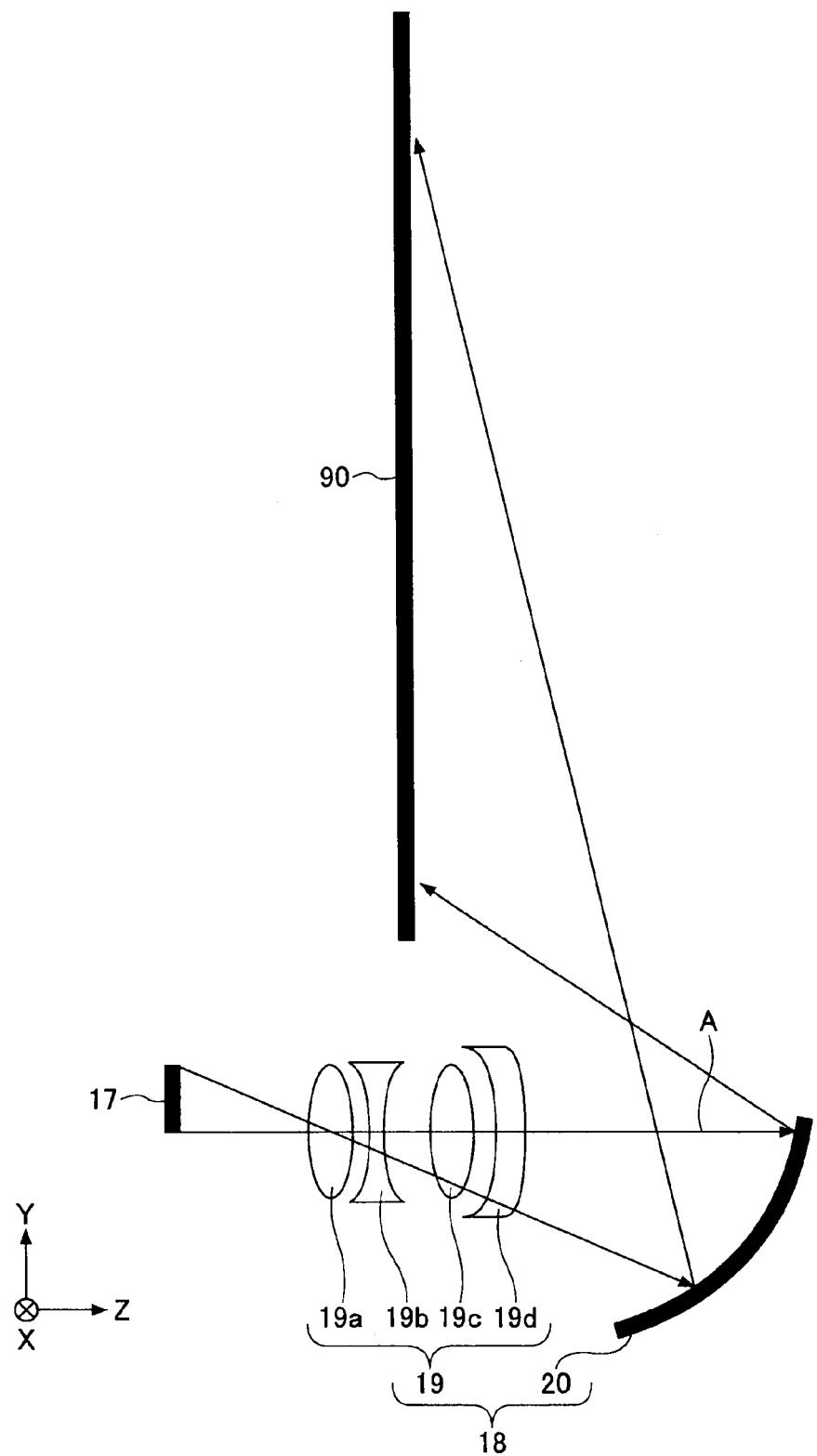
FIGS. 6A and 6B are ray diagrams exemplifying the projection optical system according to the first embodiment.

In the embodiment, the coaxial optical system 19 of the projection optical system 18 has a configuration as shown in FIG. 6A. FIG. 6A is a ray diagram exemplifying the projection optical system according to the first embodiment. The coaxial optical system 19 in FIG. 2 is more specifically shown in FIG. 6A. The coaxial optical system 19 shown in FIG. 6A includes, from a side of the image forming element 17, a lens 19a, a lens 19b, a lens 19c and a lens 19d, in this order. In the coaxial optical system 19, the lens 19a is a lens having a positive refractive power. The lens 19b is a lens having a negative refractive power. The lens 19c is a lens having a positive refractive power. The lens 19d is a lens having a negative refractive power. Here, each of the lenses 19a-19d may be one of a group of lenses.

The lens 19a is fixed. The lenses 19b, 19c, and 19d are independently reciprocable in the Z-axis direction (the direction of the optical axis A).

Namely, for the coaxial optical system 19 a floating focusing method is adopted. In the floating focusing method, the plural lenses (the lenses 19b, 19c, and 19d) in the coaxial optical system 19 move corresponding distances, which are different from each other, in the Z-axis direction (in the direction of the optical axis A), and the focus is adjusted. Here, in the embodiment, the curved-surface mirror 20 is fixed and does not move when the focus is adjusted. The reason is that, when a component such as the curved-surface mirror 20, which is large and serves as the most important function for the correction of the deformation, is moved, a positional error with respect to the coaxial optical system 19 becomes greater, and this leads to an increase of the deformation.

Figure 7:
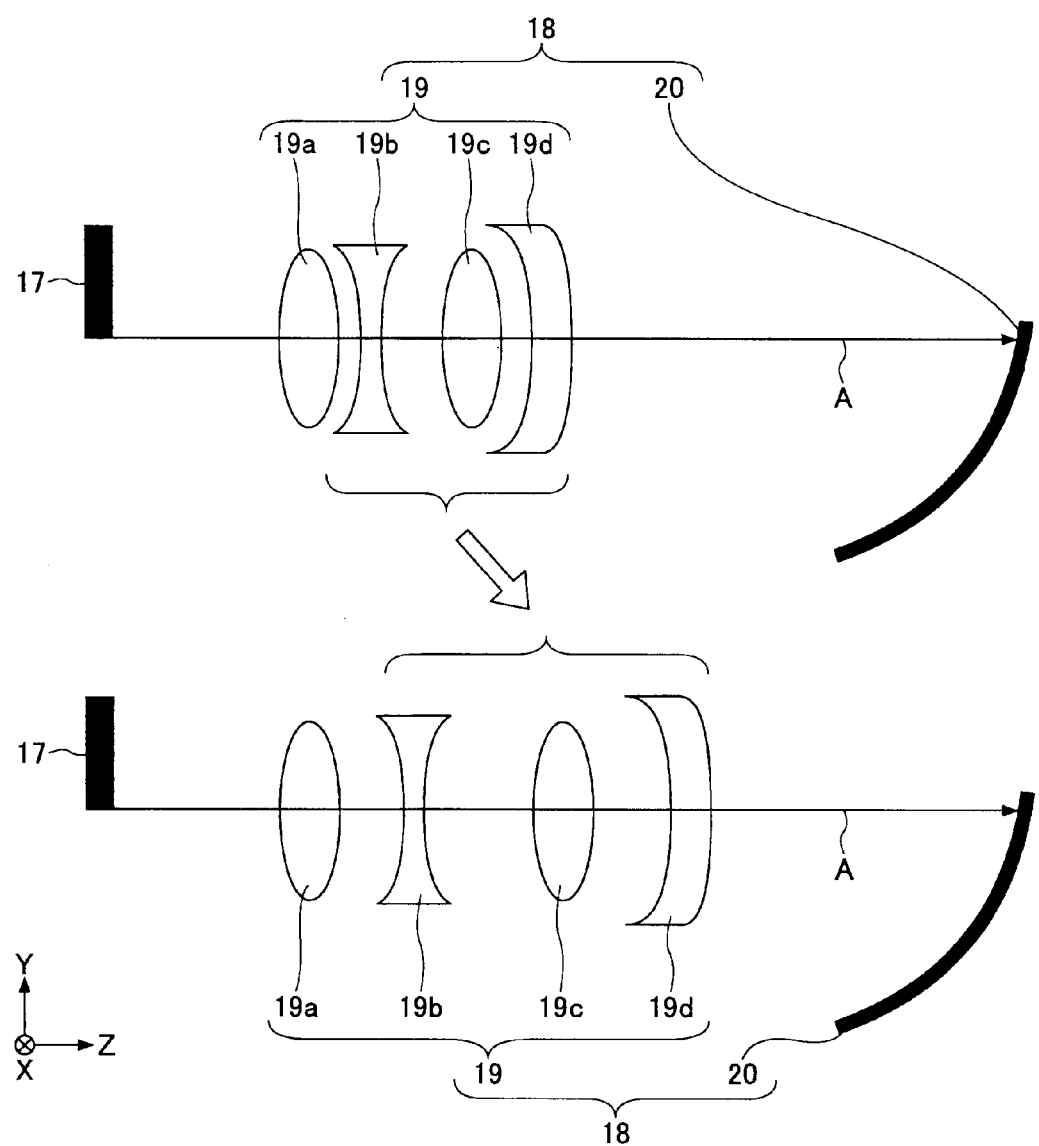
FIG. 7 is a diagram illustrating a focus adjustment process according to the first embodiment.

When the size of the screen 90 is reduced by moving the screen 90 close to the curved-surface mirror 20 from the state indicated in FIG. 6A and the focus is adjusted, the lenses 19b, 19c, and 19d are moved away from the lens 19a in the Z-axis direction, which is the direction of the optical axis A, as shown in FIG. 7. Here, the displacements of the lenses 19b, 19c, and 19d may be different from each other. Further, when the size of the screen 90 is enlarged by separating the screen 90 from the curved-surface mirror 20 and the focus is adjusted, the lenses 19b, 19c, and 19d are moved close to the lens 19a in the Z-axis direction, which is the direction of the optical axis A, contrary to the case of FIG. 7. Here, the displacement of the lenses 19b, 19c, and 19d may be different from each other.

In this manner, an irregularly-shaped deformation can be corrected by adjusting the focus through moving the plural lenses. Here, the irregularly-shaped deformation is specific to the optical system including the curved-surface mirror 20, which is the free-formed surface mirror. Further, the displacement of the plural lenses may be different from each other. Note that, when the focus is adjusted by moving the plural lenses while fixing the curved-surface mirror 20, which is the free-formed surface mirror, the spacing of three or more lenses is changed.

In FIG. 6A, the lenses 19c and 19d are aspheric plastic lenses. The deformation of the screen, which is specific to a free surface optical system, can be suppressed by using the free-form surface mirror as the curved-surface mirror 20 and arranging the lenses 19c and 19d, which are the aspheric plastic lenses, in the vicinity of the curved-surface mirror 20. Hereinafter, this is explained.

In FIG. 6A, when an aspheric lens is placed in the vicinity of the image forming element 17, the aspheric lens only gives the same aspheric effects to light fluxes corresponding to different angles of view. However, when the aspheric lens is placed closer to the curved-surface mirror 20, the light fluxes corresponding to the different angles of view are divided. Thus, the aspheric lens can provide different aspheric effects to the light fluxes corresponding to the different angles of view. This is the reason why the aspheric lenses are placed in the vicinity of the curved-surface mirror 20, which is the free-form surface mirror.

As shown in FIG. 6A, the effect of correcting the deformation with the aspheric lens is greater, when the aspheric lens is close to the curved-surface mirror 20, which is the free-form surface mirror. However, the outer diameter of the aspheric lens may also be greater, when the aspheric lens is close to the curved-surface mirror 20. Thus, a lens made of glass is undesirable from a viewpoint of cost and weight reduction. As in the case of the embodiment, it is preferable to use a plastic lens as the aspheric lens. Here, the aspheric plastic lens can be produced at low cost, can be produced to be lightweight, and can be shaped using a metallic mold.

As described above, there is an advantage for placing the aspheric lens in the vicinity of the curved-surface mirror 20, which is the free-form surface mirror. However, there is a disadvantage for this arrangement. The disadvantage is that, when field curvature occurs, namely, when a focal position depends on a position on the screen 90 due to an error in a production process, and when a position is focused on the screen 90 at which a depth of field is shallow, the image is deformed.

Figure 8:
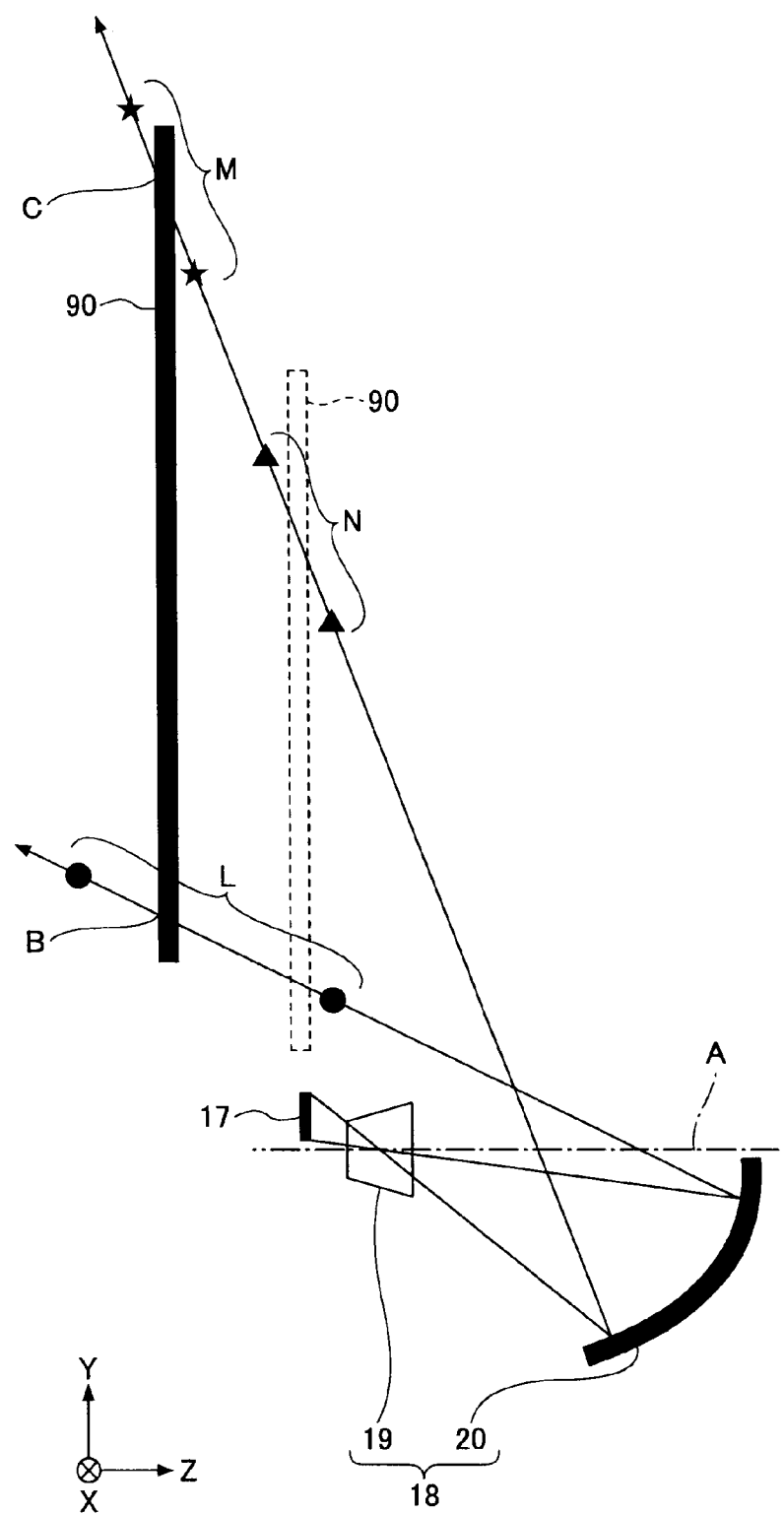
FIG. 8 is a diagram for illustrating a deformation of an image which occurs during the focus adjustment process.
Figure 9:
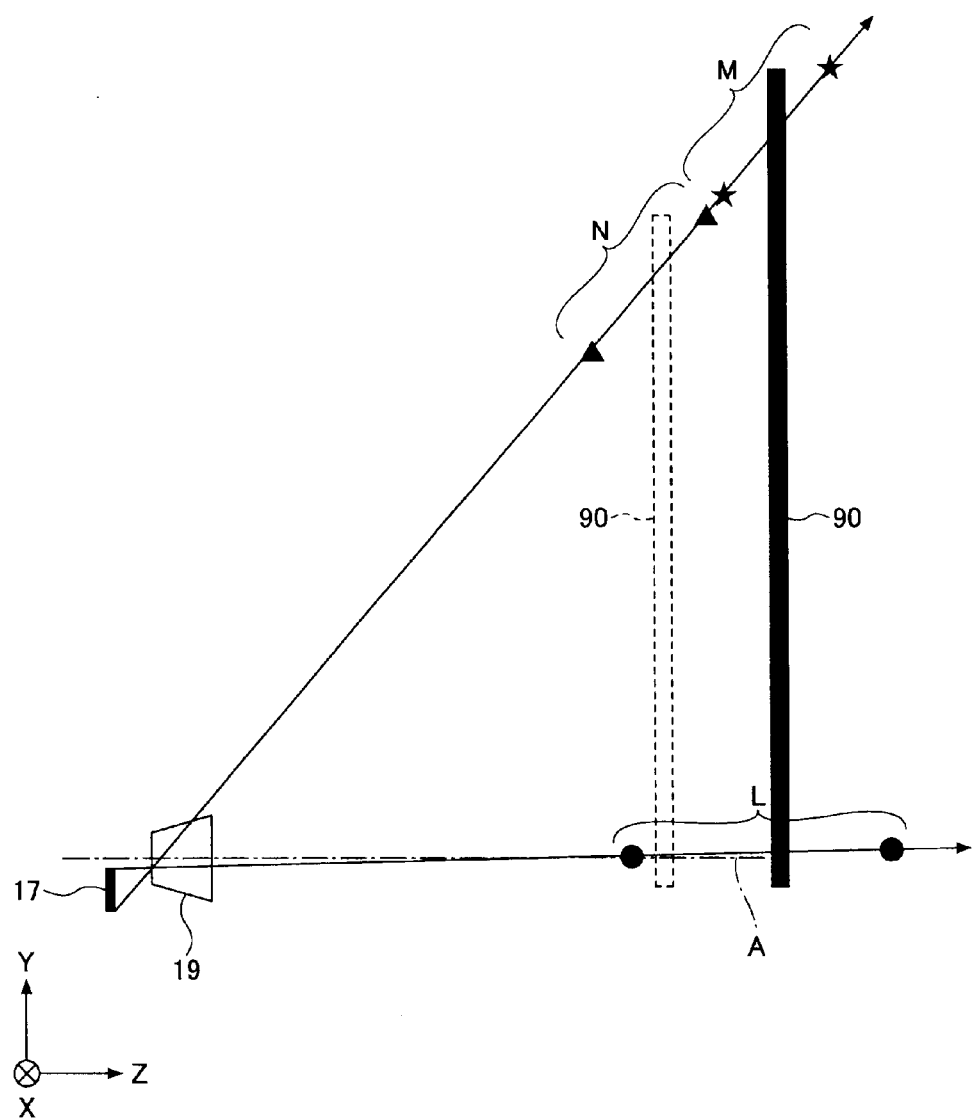
FIG. 9 is a diagram for illustrating the deformation of the image which occurs during the focus adjustment process.

Hereinafter, this is explained using FIGS. 8 and 9. Here, configurations shown in FIGS. 8 and 9 are the same as that of FIGS. 2 and 3, respectively. For example, in FIG. 8, the depth of field at a position C on the screen 90 is shallower than the depth of field at a position B on the screen 90. Here, the depth of field is a range in the direction perpendicular to the screen 90 (the Z-axis direction) within which an image is visually in focus. For example, at the position B, the image is visually in focus within a range L. However, at the position C, the image is visually in focus only within a range M. In the direction perpendicular to the screen 90 (the Z-axis direction), the depth of field is shallower at the position C than the depth of field at the position B. At the position C, an incident angle with respect to the screen 90 is greater.

Here, it is assumed that, at the position C, the image is visually in focus within a range N, instead of the range M that is the range within which the image is originally supposed to be in focus, because of some errors in the production process. In this case, the depth of field corresponding to the range L is relatively longer. Thus, in order for the image to be focused over the whole screen 90, for example, the image may be focused by moving the screen 90 to a predetermined position within the range N, as shown with the dashed line in FIG. 8. As another example, the image may be focused by moving the ranges L and N toward the screen 90.

In this manner, when the image is focused within the depth of field which is the shallower of the two, a deformation specific to the free surface is generated on the image. Here, note that the image is focused at a position shifted from the position at which the image was originally supposed to be in focus. On the other hand, as shown in FIG. 9, when the optical system does not include the curved-surface mirror 20, which is the free-form surface mirror, and when the image is focused at a predetermined position within the range N, instead of a predetermined position within the range M at which the image is originally supposed to be in focus, the deformation on the screen does not change significantly.

As described above, for the projection optical system including the plastic lens that is placed at or in the vicinity of the free-form surface mirror, there is a problem that, when errors occur in the production process, field curvature occurs. Further, when the focus is adjusted, the uncorrectable field curvature occurs in the image projected onto the projection surface, such as the screen. Among the errors in the production process, particularly, a refractive index distribution which is generated during the molding process of the plastic lens can be a cause of the occurrence of the field curvature. Here, the plastic lens is to be placed in the vicinity of the free-form surface mirror. Hereinafter, this is explained in detail.

Figure 10A:
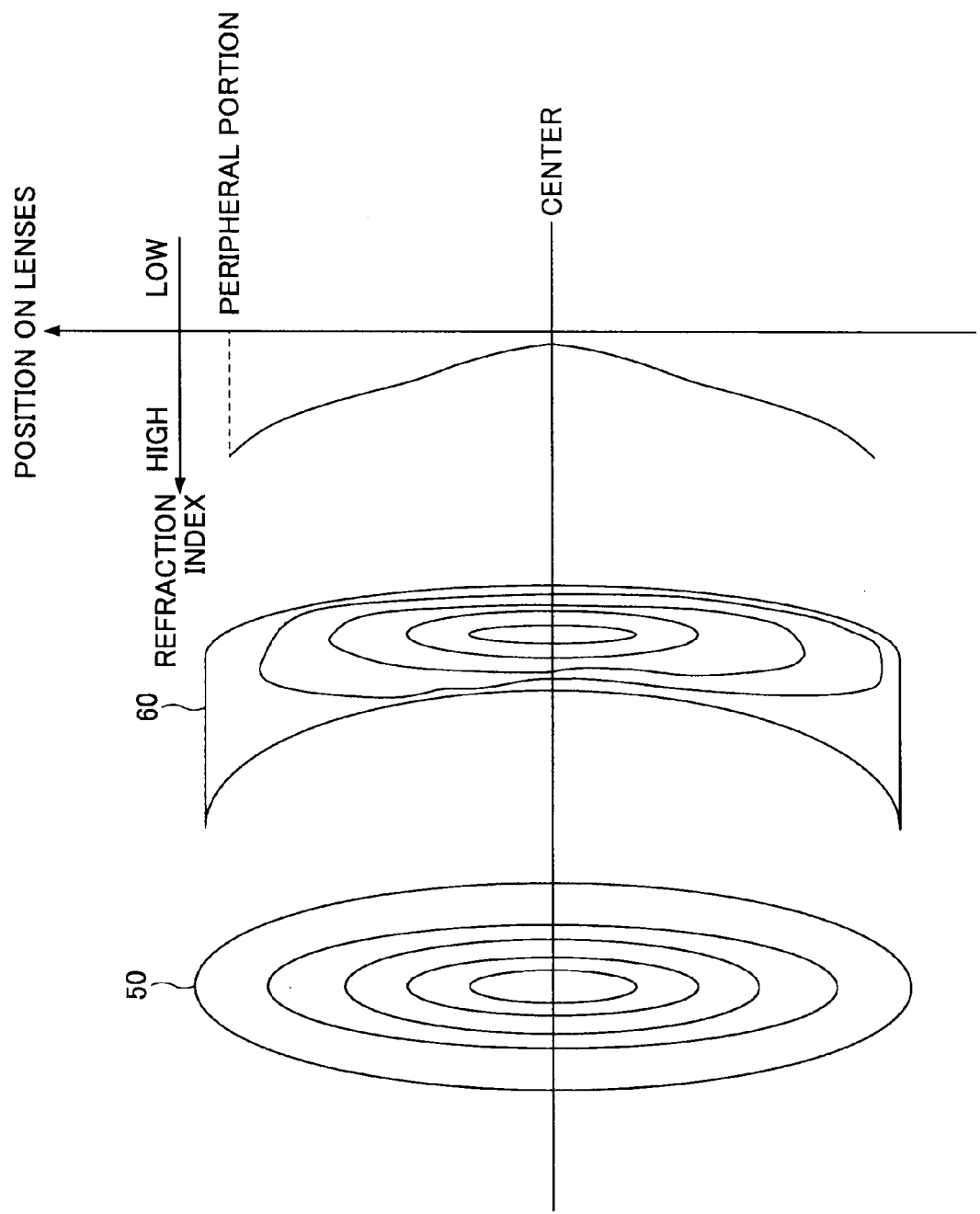
FIGS. 10A-10C are diagrams illustrating refractive index distributions of plastic lenses.

FIG. 10A shows examples of refractive index distributions of a convex lens 50 and a concave lens 60, which are aspheric plastic lenses. Recently, large aspheric lenses used in laser printers or projectors are manufactured mainly through the molding of plastic materials. This is because large aspheric lenses can be manufactured at low cost. Further, large aspheric lenses can be manufactured to be lightweight. Furthermore, the aspheric shapes can be easily formed. During a plastic molding process of an optical element, a thermally molten plastic material is shaped in metal molds. Then the shaped plastic material is cooled in the metal molds. During the cooling process, a peripheral portion is cooled relatively quickly compared to a central portion. Density at the portion which is cooled quickly becomes relatively denser, compared to density at a portion which is cooled slowly. Thus density distribution inside the shaped plastic material becomes inhomogeneous, or degradation occurs in the shaped plastic material. Therefore, the refractive index becomes inhomogeneous inside the shaped lens, and the refractive index distribution is generated.

The refractive index inside the plastic lens at the peripheral portion is higher than that of the central portion. As described above, this is because, during the shaping of the lens, the peripheral portion is cooled more quickly than the central portion, and the density at the peripheral portion becomes relatively denser compared to the density at the central portion. Therefore, the refractive index distributions become, for example, the distributions shown in FIG. 10A. When the concave lens 60 having such a refractive index distribution is placed, for example, at the closest position to the curved-surface mirror 20 in FIG. 6A, refractive power to a light flux passing through the position at which the refractive index is high (the light which travels toward the upper portion on the screen) is insufficient, and the range within which the image is in focus is displaced to the left side of the screen (the direction which is opposite to the direction from the screen 90 to N in FIG. 8). Thus, field curvature occurs. In this manner, when the aspheric lens is placed in the vicinity of the curved-surface mirror 20, which is the free-form surface mirror, the field curvature occurs during focus adjustment.

However, in the embodiment, the lenses 19c and 19d, which are aspheric plastic lenses, are placed in the vicinity of the curved-surface mirror 20, which is the free-form surface mirror, instead of placing only one aspheric lens in the vicinity of the curved-surface mirror 20. Therefore, the field curvature caused by the refractive index distribution of the aspheric plastic lens can be reduced.

Figure 10B:
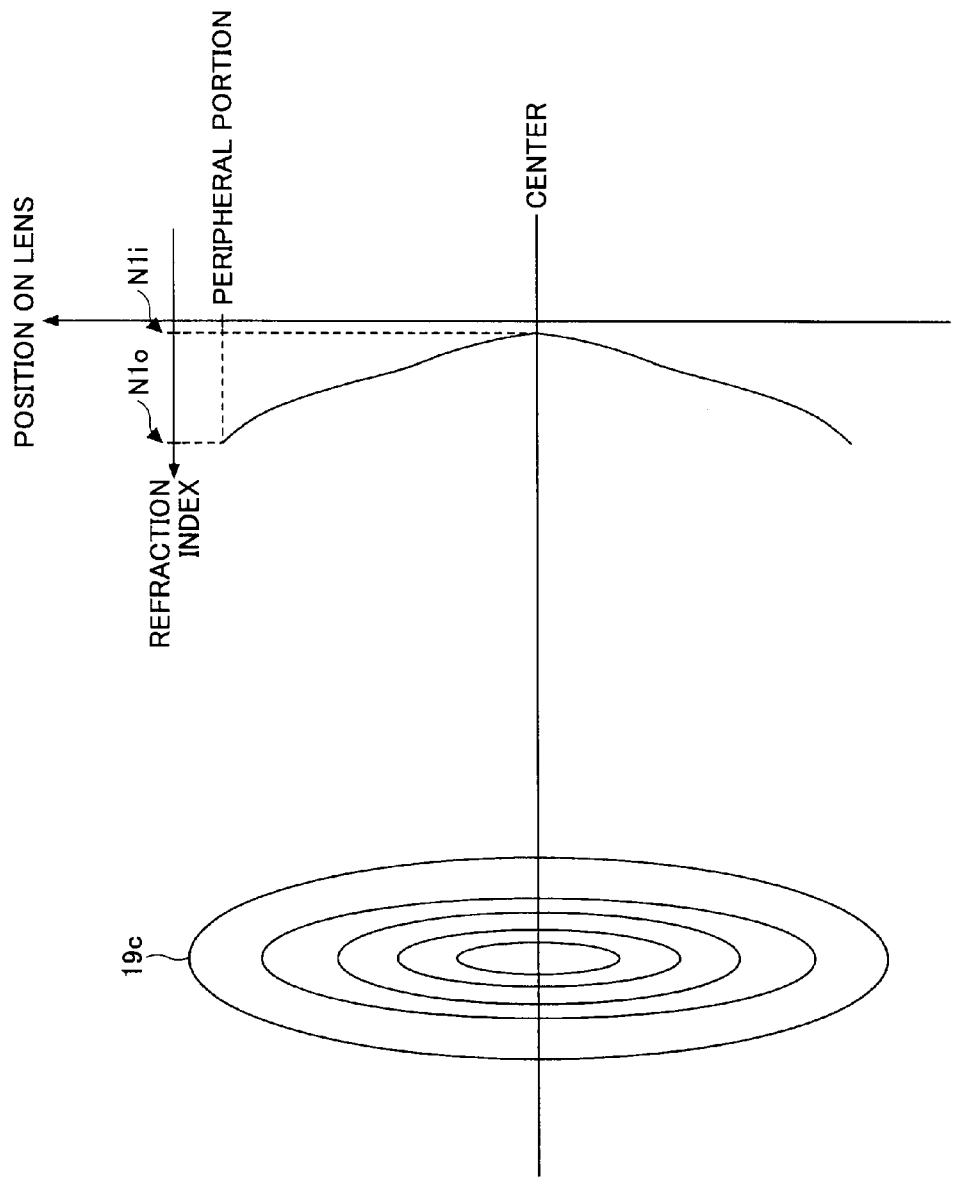
Figure 10C:
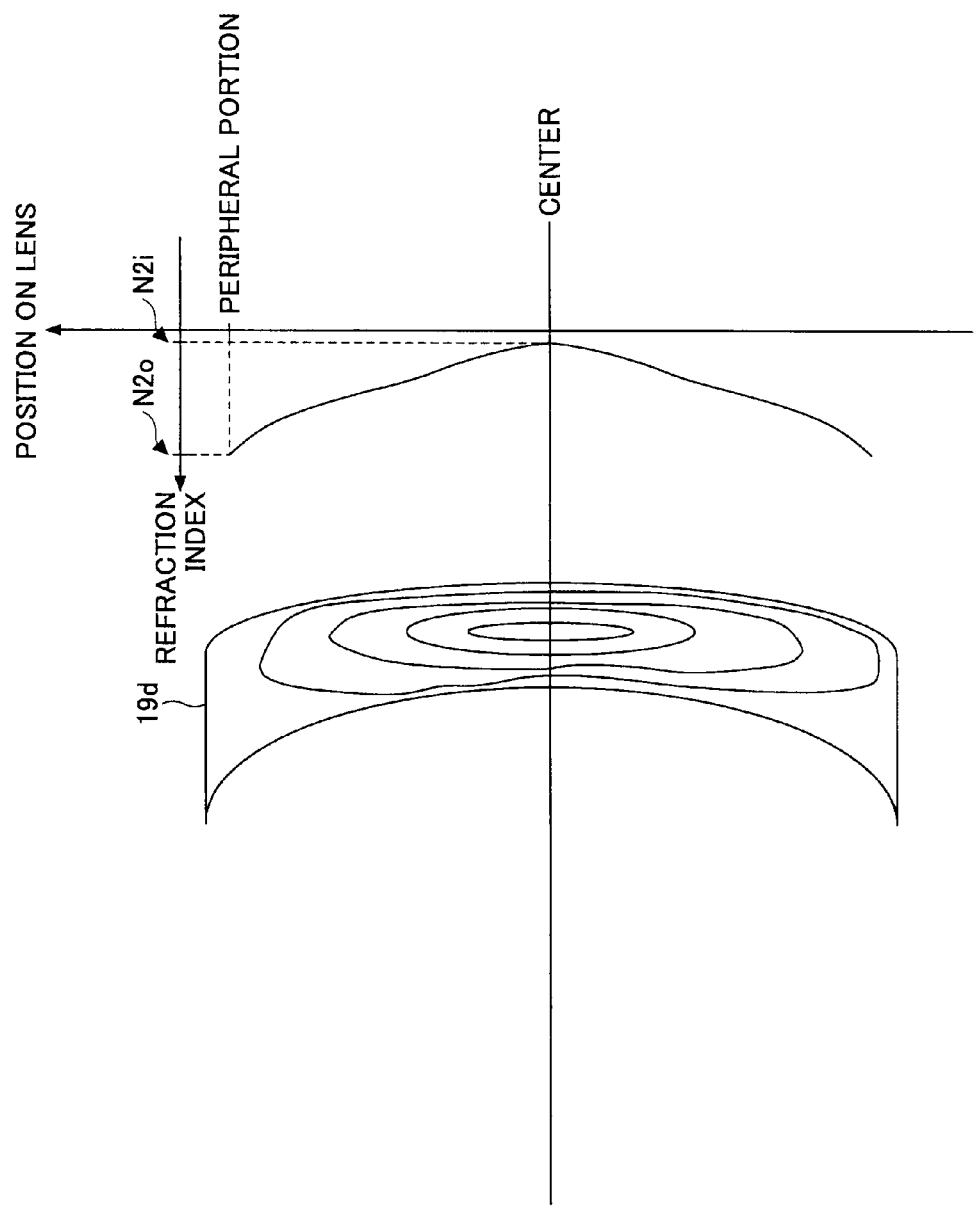

Namely, the lenses 19c and 19d have the refractive index distributions similar to the refractive index distributions of the convex lens 50 and the concave lens 60 shown in FIG. 10A (cf. FIGS. 10B and 10C). Suppose that the lenses 19c and 19d have similar refractive index distributions. For example, each refractive index distribution is such that the refractive index becomes higher as the position moves from the center of the lens to the peripheral portion, as shown in FIGS. 10B and 10C. As the refractive index of the lens 19c becomes higher at the end portion of the lens 19c, the point of focus at the position C on the screen is displaced to the front side of the screen, as shown in FIG. 8.

However, as shown in FIG. 10C, as the refractive index of the lens 19d becomes higher at the end portion of the lens 19d, similarly to the case of the lens 19c, the point of the focus at the position C on the screen is displaced to the opposite side (the rear side of the screen). Namely, the field curvature can be reduced by using both the lens 19c and the lens 19d. Because of this effect, it is preferable to arrange a set of lenses including a lens with a positive refractive power and a lens with a negative refractive power, when aspheric lenses having large deformation correcting effects are used in the optical system including the curved-surface mirror 20, which is the free-form surface mirror.

However, when the refractive index at the center of the lens 19c is defined to be $N1_i$ and the refractive index at the peripheral portion of the lens 19c is defined to be $N1_o$ as shown in FIG. 10B, and when the refractive index at the center of the lens 19d is defined to be $N2_i$ and the refractive index at the peripheral portion of the lens 19d is defined to be $N2_o$ as shown in FIG. 10C, it may not be necessary that characteristics of the refractive index distributions of the lenses 19c and 19d be such that the refractive index becomes higher as the position moves from the center of the lens to the peripheral portion of the lens, as shown in FIG. 10A, provided that a sign of a difference of the refractive indices $\Delta N_1 = N1_o - N1_i$ for the lens 19c, which is the difference between the refractive index at the center of the lens 19c and the refractive index at the peripheral portion of the lens 19c, is equal to a sign of a difference of the refractive indices $\Delta N_2 = N2_o - N2_i$ for the lens 19d, which is the difference between the refractive index at the center of the lens 19d and the refractive index at the peripheral portion of the lens 19d. The reason is that, when the sign of the difference of the refractive indices $\Delta N_1 = N1_o - N1_i$ for the lens 19c and the sign of the difference of the refractive indices $\Delta N_2 = N2_o - N2_i$ for the lens 19d are the same, the effects of the refractive index distributions can be canceled out.

Figure 6B:
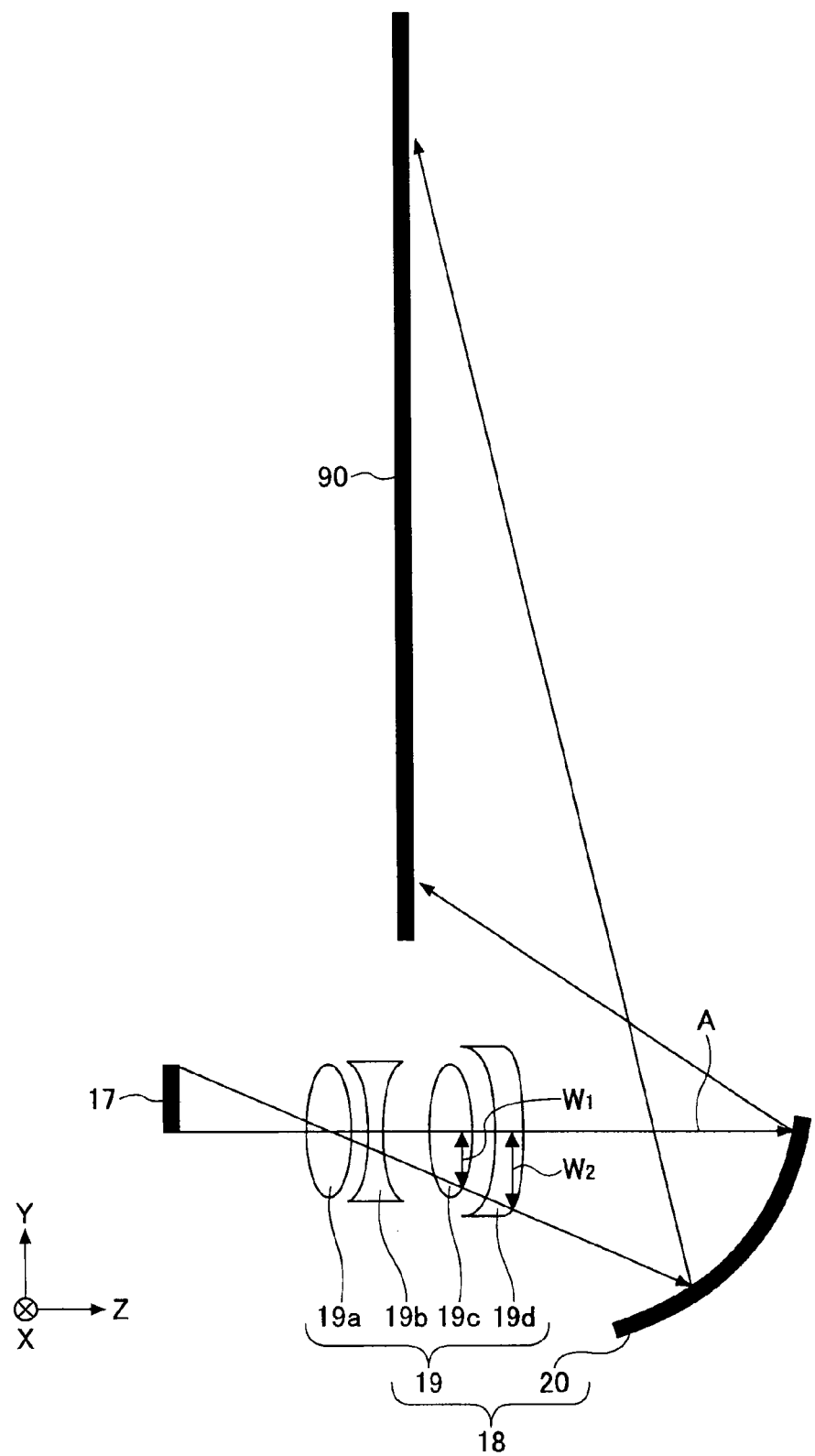

Further, when the difference between the refractive index at the center of the lens 19c and the refractive index at the peripheral portion of the lens 19c is defined to be $\Delta N_1$, a distance from a point, at which the outermost light beam among light beams passing through the lens 19c exits the lens 19c, to the optical axis is defined to be $W_1$ (cf. FIG. 6B), the difference between the refractive index at the center of the lens 19d and the refractive index at the peripheral portion of the lens 19d is defined to be $\Delta N_2$, and a distance from a point, at which the outermost light beam among light beams passing through the lens 19d exits the lens 19d, to the optical axis is defined to be $W_2$ (cf. FIG. 6B), it is preferable that $(\Delta N_1/W_1)$ and $(\Delta N_2/W_2)$ be substantially equal. Further, it is preferable that a focal distance of the lens 19c and a focal distance of the lens 19d be substantially equal. That is because the effects of the refractive index distributions can be effectively canceled out.

Further, as described above, when the light fluxes reflected on the image forming element 17 approaches the curved-surface mirror 20, the light fluxes are divided into the plural light fluxes corresponding to the angles of view. Since the intensity of the light used in the image projection device 10, such as the projector, is strong and the lens closer to the image forming element 17 is irradiated by the light fluxes not being separated, the temperature of the lens closer to the image forming element 17 tends to become higher compared to an outside air temperature. On the other hand, the temperature of the lens closer to the curved-surface mirror 20 does not become as high in comparison to the lens closer to the image forming element 17. Thus an expansion or a change in the refractive index caused by heat does not tend to occur in the lens closer to the curved-surface mirror 20 in comparison to the lens closer to the image forming element 17. Since the aspheric plastic lens is sensitive to the expansion or the change in the refractive index caused by heat, it is preferable that the aspheric plastic lens be arranged at a position closer to the curved-surface mirror 20. Especially, it is preferable that one of the lenses 19c and 19d be arranged at the closest position to the curved-surface mirror 20 among the optical elements included in the coaxial optical system 19. Further, when the lenses 19c and 19d are arranged adjacent to each other, temperatures of the lenses 19c and 19d are nearly equal. Thus the effect of heat can be reduced.

As described above, in the first embodiment, the projection optical system 18 includes the coaxial optical system 19 including the lens 19c having the positive refractive power and the lens 19d having the negative refractive power; and the curved-surface mirror 20 which is the non-coaxial optical system that does not share the optical axis with the coaxial optical system 19. Further, the lenses 19c and 19d may be aspheric plastic lenses. The refractive index distribution of the lens 19c between the center of the lens 19c and the peripheral portion of the lens 19c (for example, the refractive index distribution such that the refractive index becomes higher as the position moves from the center of the lens 19c to the peripheral portion of the lens 19c) may be similar to the refractive index distribution of the lens 19d between the center of the lens 19d and the peripheral portion of the lens 19d. One of the lenses 19c and 19d may be arranged at the closest position to the curved-surface mirror 20 among the elements included in the coaxial optical system 19. As a result, the effect of the refractive index distributions are cancelled out by the lens 19c having the positive refractive power and the lens 19d having the negative refractive power. Thus the field curvature can be reduced. Further, by arranging the lenses 19c and 19d, which are the aspheric plastic lenses, at the positions closer to the curved-surface mirror 20, the effect of temperature rise in the image projection device 10 can be reduced.

Second Embodiment

Figure 11:
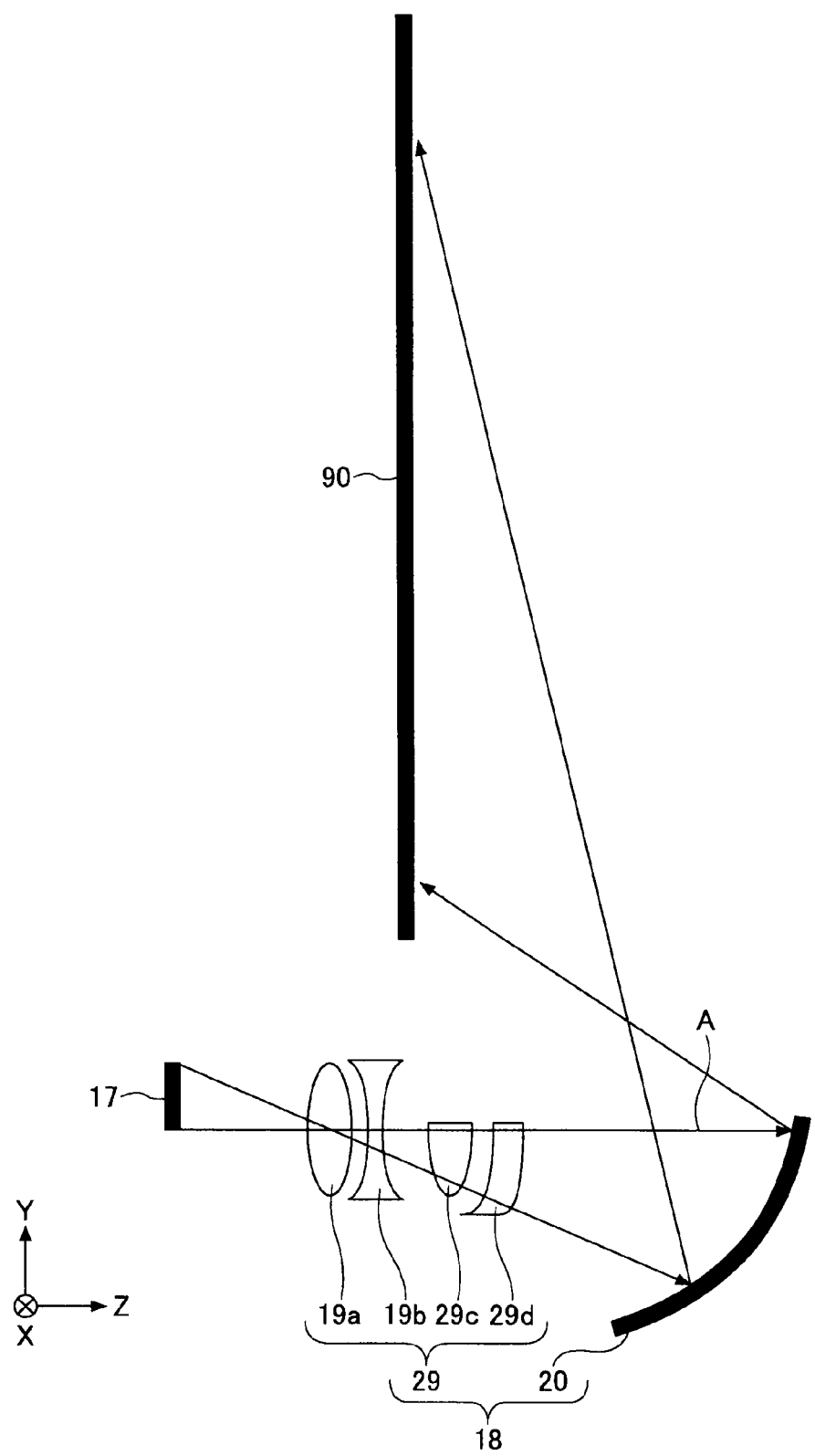
FIG. 11 is a ray diagram exemplifying a projection optical system according to a second embodiment.

In a second embodiment, the projection optical system 18 and a coaxial optical system 29 are arranged as shown in FIG. 11. Namely, the coaxial optical system 29 has a common configuration with the coaxial optical system 19 except that the lenses 19c and 19d are replaced by lenses 29c and 29d. In the coaxial optical system 29, the lens 29c has a common configuration with the lens 19c except that a portion of the lens 19c (substantially the upper half portion) is removed. The lens 29c has a positive refractive power. The lens 29c is an aspheric plastic lens. Further, the lens 29d has a common configuration with the lens 19d except that a portion of the lens 19d (substantially the upper half portion) is removed. The lens 29d has a negative refractive power. The lens 29d is an aspheric plastic lens. Here, each of the lenses 19a, 19b, 29c, and 29d may be one lens in a group of lenses.

The lens 19a is fixed. The lenses 19b, 29c, and 29d are independently reciprocable in the Z-axis direction (the direction of the optical axis A). Namely, the coaxial optical system 29 adopts the floating focusing method in which the plural lenses (the lenses 19b, 29c, and 29d) in the coaxial optical system 29 move corresponding distances, which are different from each other, in the Z-axis direction (in the direction of the optical axis A) and the focus is adjusted.

In the coaxial optical system 19 shown in FIG. 6A, even if the lens placed closer to the curved-surface mirror 20 is shaped rotationally symmetric, the light fluxes only pass through a portion of the lens corresponding to a half of the diameter. Further, the outer diameter of the lens placed closer to the curved-surface mirror 20 is larger than that of the lens placed closer to the image forming element 17. This can be a cause of an increase in size of the image projection device 10. Therefore, it is preferable that the lens 29c be shaped such that a portion (substantially the upper half portion) of the rotationally symmetric shape (the shape of the lens 19c), through which the light fluxes do no pass, is removed from the rotationally symmetric shape and that the lens 29d be shaped such that a portion (substantially the upper half portion) of the rotationally symmetric shape (the shape of the lens 19d), through which the light fluxes do no pass, is removed from the rotationally symmetric shape. This facilitates the downsizing of the image projection device 10.

Since the lenses 29c and 29d are aspheric plastic lenses, the lenses 29c and 29d can be formed by metal molding. Therefore, as shown in FIG. 11, the lens 29c can be easily formed to have the shape such that the portion (substantially the upper half portion), through which the light fluxes do not pass, is removed from the rotationally symmetric shape. Similarly, the lens 29d can be easily formed to have the shape such that the portion (substantially the upper half portion), through which the light fluxes do not pass, is removed from the rotationally symmetric shape. The lenses 29c and 29d can be produced with less amounts of plastic material compared to the lenses 19c and 19d. Therefore, using the lenses 29c and 29d facilitates resource saving and cost reduction.

As described above, the second embodiment provides the effect described below, in addition to the effect similar to the effect of the first embodiment. Namely, in the second embodiment, the lenses 29c and 29d, which are placed closer to the curved-surface mirror 20, are formed, so that each of the lenses 29c and 29d has the shape such that the portion (substantially the upper half portion), through which the light fluxes do not pass, is removed from the rotationally symmetric shape. Thus the second embodiment can facilitate downsizing, resource saving, and cost reduction of the image projection device 10.

Third Embodiment

Figure 12:
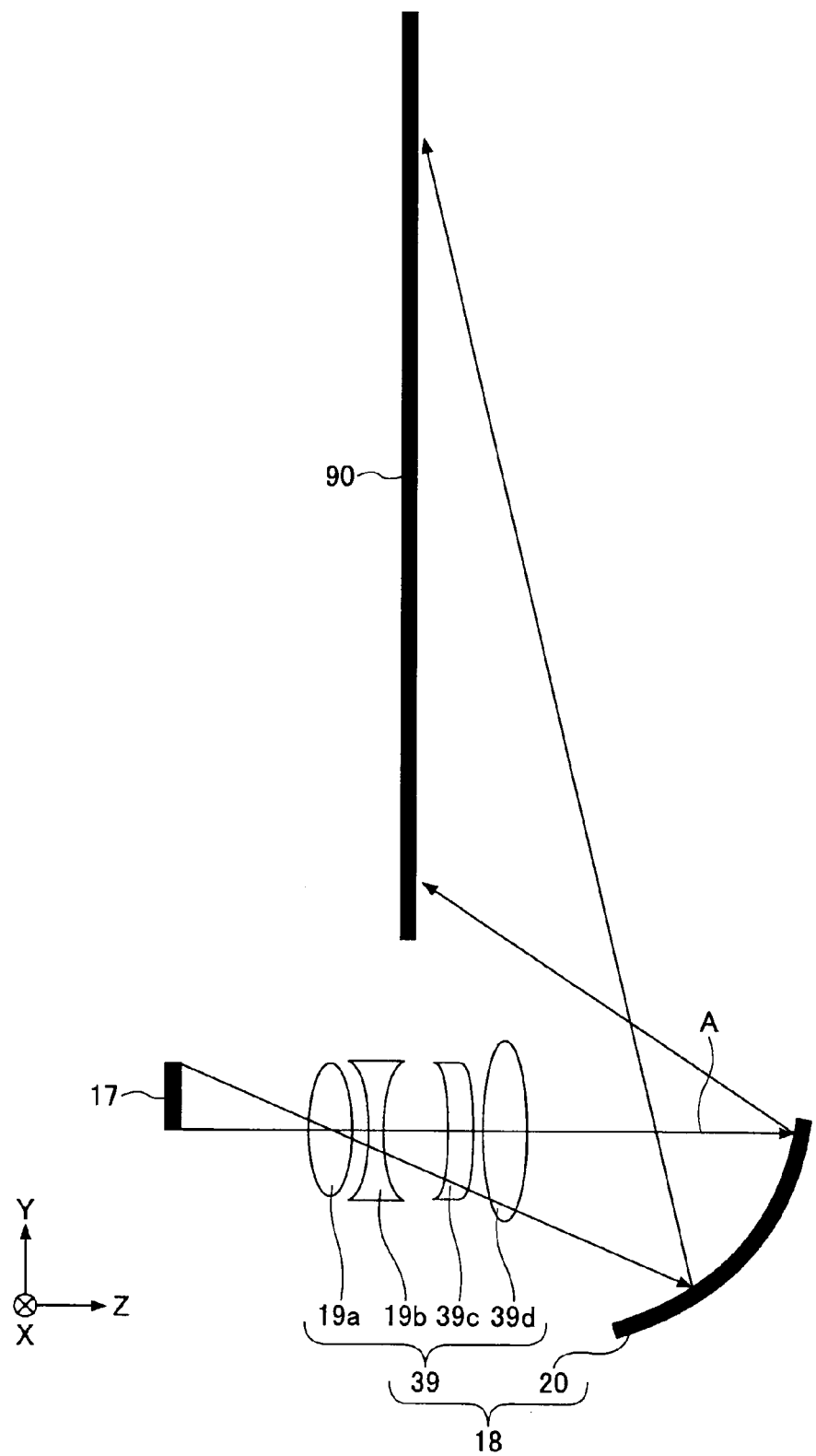
FIG. 12 is a ray diagram exemplifying a projection optical system according to a third embodiment.

In the third embodiment, the projection optical system 18 and a coaxial optical system 39 are arranged as shown in FIG. 12. Namely, the coaxial optical system 39 has a common configuration with the coaxial optical system 19 except that the lenses 19c and 19d are replaced by lenses 39c and 39d. In the coaxial optical system 39, the lens 39c is a lens having a negative refractive power and is an aspheric plastic lens. Further, the lens 39d is a lens having a positive refractive power and is an aspheric plastic lens. Here, each of the lenses 19a, 19b, 39c, and 39d may be one lens in a group of lenses.

The lens 19a is fixed. The lenses 19b, 39c, and 39d are independently reciprocable in the Z-axis direction (the direction of the optical axis A). Namely, the coaxial optical system 39 adopts the floating focusing method in which the plural lenses (the lenses 19b, 39c, and 39d) in the coaxial optical system 39 move corresponding distances, which are different from each other, in the Z-axis direction (in the direction of the optical axis A) and the focus is adjusted.

Any one of the convex lens and the concave lens, which are the aspheric plastic lenses, can be placed closer to the curved mirror 20. In the coaxial optical system 19 shown in FIG. 6A, the concave lens (the lens 19d) is placed closer to the curved-surface mirror 20. However, in the coaxial optical system 39 shown in FIG. 12, the convex lens (the lens 39d) is placed closer to the curved-surface mirror 20. Namely, placing the convex lens closer to the curved-surface mirror 20 and placing the concave lens closer to the curved-surface mirror 20 provide similar effects, provided that the convex lens and the concave lens are arranged at corresponding positions where the light fluxes are separated. Here, a glass lens may be placed between the convex lens and the concave lens. Placing the glass lens between the convex lens and the concave lens still provides the effect to cancel out the field curvature, similarly to the case in which the convex lens and the concave lens are arranged adjacent to each other.

As described above, in the third embodiment, the convex lens (the lens 39d) is placed closer to the curved-surface mirror 20. Placing the convex lens closer to the curved-surface mirror 20 provides the effect similar to the effect of the first embodiment, in which the concave lens (the lens 19d) is placed closer to the curved-surface mirror 20.

Fourth Embodiment

In the fourth embodiment, the projection optical system 18 and a coaxial optical system 49 are arranged as shown in FIG. 12. Namely, the coaxial optical system 49 has a common configuration with the coaxial optical system 19 except that the lenses 19c and 19d are replaced by a group of lenses 49c. In the coaxial optical system 49, the group of lenses 49c has a configuration such that the group of lenses 49c includes a lens $49c_1$ and a lens $49c_2$ that are joined and integrated. Here, each of the lenses 19a and 19b may be one of many lenses included in a group. Further, the group of lenses 49c may include a lens other than the lenses $49c_1$ and $49c_2$.

The lens 19a is fixed. The lens 19b and the group of lenses 49c are independently reciprocable in the Z-axis direction (the direction of the optical axis A). Namely, the coaxial optical system 49 adopts the floating focusing method in which the lens and the group of lenses (the lens 19b and the group of lenses 49c) in the coaxial optical system 49 move corresponding distances, which are different from each other, in the Z-axis direction (in the direction of the optical axis A) and the focus is adjusted.

The lens $49c_1$ is a lens having a negative refractive power. The lens $49c_1$ is a plastic lens such that the surface closer to the image forming element 17 is an aspheric surface and the surface closer to the curved-surface mirror 20 is a spherical surface. Further, the lens $49c_2$ is a lens having a positive refractive power. The lens $49c_2$ is a plastic lens such that the surface closer to the image forming element 17 is a spherical surface and the surface closer to the curved-surface mirror 20 is an aspheric surface. The spherical surface of the lens $49c_1$ and the spherical surface of the lens $49c_2$ are joined. In this case, the lenses $49c_1$ and $49c_2$ receive similar effects of temperature change which is caused by high-intensity light fluxes from the image projection device 10. Thus the effects of the temperature change can be efficiently cancelled out. Further, it is especially preferable that absolute values of the refractive powers of the lenses $49c_1$ and $49c_2$ be set to be close. When the absolute values of the refractive powers of the lenses $49c_1$ and $49c_2$ are close, the effect of cancelling out the thermal effect is improved.

As described above, the fourth embodiment provides the effect described below, in addition to the effect similar to the effect of the first embodiment. Namely, in the coaxial optical system 49, the group of lenses 49c is arranged. The lens 49c includes the lens $49c_1$ having a negative refractive power and being a plastic lens such that the surface closer to the image forming element 17 is the aspheric surface and the surface closer to the curved-surface mirror 20 is the spherical surface; and the lens $49c_2$ having a positive refractive power and being a plastic lens such that the surface closer to the image forming element 17 is the spherical surface and the surface closer to the curved-surface mirror 20 is the aspheric surface. Here, the spherical surfaces of the lenses $49c_1$ and $49c_2$ are joined. As a result, the effect of the temperature change on the group of lenses 49c can be cancelled out. Here, the temperature change is caused by the high-intensity light fluxes from the image projection device 10.

Figure 13:
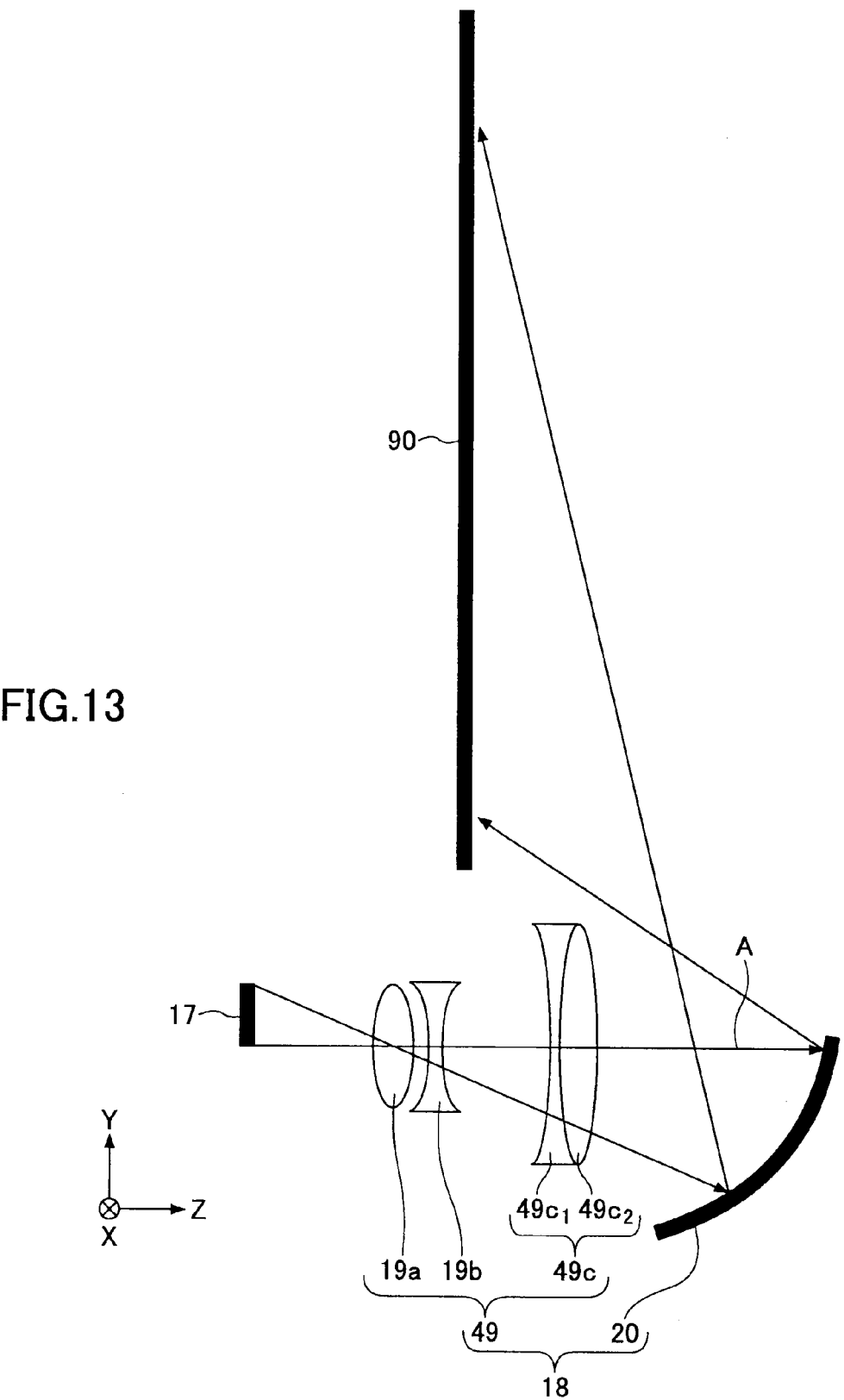
FIG. 13 is a ray diagram exemplifying a projection optical system according to a fourth embodiment.

Incidentally, in FIG. 13, the group of lenses 49c arranged in the coaxial optical system 49 may have the following configuration. Namely, the group of lenses 49c includes the lens $49c_1$ and the lens $49c_2$. Here, the lens $49c_1$ may have a positive refractive power, and the lens $49c_1$ may be a plastic lens such that the surface closer to the image forming element 17 is an aspheric surface and the surface closer to the curved-surface mirror 20 is a spherical surface. Further, the lens $49c_2$ may have a negative refractive power, and the lens $49c_2$ may be a plastic lens such that the surface closer to the image forming element 17 is a spherical surface and the surface closer to the curved-surface mirror 20 is an aspheric surface. Here, the spherical surfaces of the lenses $49c_1$ and $49c_2$ are joined.

The preferred embodiments are described above. However, the present invention is not limited to the specifically disclosed embodiments, and variations and modifications may be made without departing from the scope of the present invention.

The present application is based on Japanese Priority Application No. 2010-290068 filed on Dec. 27, 2010, the entire contents of which are hereby incorporated herein by reference.

What is claimed is:

1. A projection optical system for projecting an image on a surface to be projected, the image being an enlarged image of a formed image which is formed on an image forming element, the projection optical system comprising:

a coaxial optical system having an optical axis; and
a non-coaxial optical system including a rotationally asymmetric curved-surface mirror, the non-coaxial optical system not sharing the optical axis with the coaxial optical system,
wherein the coaxial optical system and the non-coaxial optical system are arranged in this order on a light path from the image forming element to the surface,
wherein the coaxial optical system includes, at least, a first lens having a positive refractive power and being an aspheric plastic lens; and a second lens having a negative refractive power and being an aspheric plastic lens,
wherein the first lens has a first refractive index distribution along a first direction from the center of the first lens to a peripheral portion of the first lens, and the second lens has a second refractive index distribution along a second direction from the center of the second lens to a peripheral portion of the second lens, and
wherein one of the first lens and the second lens is arranged at a position closest to the curved-surface mirror among the optical elements included in the coaxial optical system.

2. The projection optical system according to claim 1, wherein,
when, for the first lens, a first refractive index at the center of the first lens is N1, and the first refractive index at the peripheral portion of the first lens is $N1_o$, and when, for the second lens, a second refractive index at the center of the second lens is $N2_i$ and the second refractive index at the peripheral portion of the second lens is $N2_o$, a sign of a first difference of the first refractive indices of the first lens $\Delta N_1 = N1_i - N1_o$ along the first direction from the center of the first lens to the peripheral portion of the first lens is equal to a sign of a second difference of the second refractive indices of the second lens $\Delta N_2 = N2_i - N2_o$ along the second direction from the center of the second lens to the peripheral portion of the second lens.

3. The projection optical system according to claim 2, wherein
the first lens and the second lens are independently reciprocable in a direction along the optical axis so as to adjust a focal point of the image being projected on the surface, and
wherein the focal point of the image being projected on the surface is adjusted by changing a spacing of at least three optical elements included in the projection optical system, the at least three optical elements including the first lens, the second lens, and the curved-surface mirror.

4. The projection optical system according to claim 3, wherein
the curved-surface mirror is a free-form surface mirror, and
wherein, when a horizontal direction of the surface is defined to be an X-axis direction and a vertical direction of the surface is defined to be a Y-axis direction, a curvature in the X-axis direction of the curved-surface mirror increases as a Y-axis coordinate value increases from a first Y-axis coordinate value corresponding to a first end portion of the curved-surface mirror, the first end portion being close to the optical axis of the coaxial optical system, to a second Y-axis coordinate value corresponding to a second end portion of the curved-surface mirror, the second end portion being separated from the optical axis of the coaxial optical system.

5. The projection optical system according to claim 2, wherein,
when a first distance from a first point, at which a first outermost light beam among first light beams passing through the first lens exits the first lens, to the optical axis is $W_1$, and when a second distance from a second point, at which a second outermost light beam among second light beams passing through the second lens exits the second lens, to the optical axis is $W_2$, $(\Delta N_1/W_1)$ and $(\Delta N_2/W_2)$ are substantially equal.

6. The projection optical system according to claim 1, wherein
a focal distance of the first lens and a focal distance of the second lens are substantially equal.

7. The projection optical system according to claim 1, wherein
the first lens and the second lens are arranged adjacent to each other.

8. The projection optical system according to claim 1, wherein
at least one of the first lens and the second lens has a shape such that a portion, through which light fluxes do not pass, is removed from a rotationally symmetric shape.

9. A projection optical system for projecting an image on a surface to be projected, the image being an enlarged image of a formed image which is formed on an image forming element, the projection optical system comprising:
a coaxial optical system having an optical axis; and
a non-coaxial optical system including a rotationally asymmetric curved-surface mirror, the non-coaxial optical system not sharing the optical axis with the coaxial optical system,
wherein the coaxial optical system and the non-coaxial optical system are arranged in this order on a light path from the image forming element to the surface,
wherein the coaxial optical system includes at least a group of lenses including a first lens and a second lens,
wherein the first lens has a first refractive power, a surface of the first lens close to the image forming element being an aspheric surface, and a surface of the first lens close to the curved-surface mirror being a spherical surface,
wherein the second lens has a second refractive power, a surface of the second lens close to the image forming element being a spherical surface, and a surface of the second lens close to the curved-surface mirror being an aspheric surface,
wherein the spherical surface of the first lens and the spherical surface of the second lens are joined,
wherein the first lens has a first refractive index distribution along a first direction from the center of the first lens to a peripheral portion of the first lens, and the second lens has a second refractive index distribution along a second direction from the center of the second lens to a peripheral portion of the second lens, and
wherein the second lens is arranged at a closest position to the curved-surface mirror among the optical elements included in the coaxial optical system.

10. A projection optical system according to claim 9, wherein
the first refractive power is a positive refractive power and the second refractive power is a negative refractive power.

11. A projection optical system according to claim 9, wherein
the first refractive power is a negative refractive power and the second refractive power is a positive refractive power.

12. An image projection device comprising:
an image forming element configured to form a formed image thereon in accordance with a modulated signal; and
a projection optical system that irradiates light from a light source to the image forming element and projects an image on a surface to be projected, the image being an enlarged image of the formed image which is formed on the image forming element, the projection optical system including:
a coaxial optical system having an optical axis; and
a non-coaxial optical system including a rotationally asymmetric curved-surface mirror, the non-coaxial optical system not sharing the optical axis with the coaxial optical system,
wherein the coaxial optical system and the non-coaxial optical system are arranged in this order on a light path from the image forming element to the surface,
wherein the coaxial optical system includes, at least, a first lens having a positive refractive power and being an aspheric plastic lens; and a second lens having a negative refractive power and being an aspheric plastic lens,
wherein the first lens has a first refractive index distribution along a first direction from the center of the first lens to a peripheral portion of the first lens, and the second lens has a second refractive index distribution along a second direction from the center of the second lens to a peripheral portion of the second lens, and
wherein one of the first lens and the second lens is arranged at a position closest to the curved-surface mirror among the optical elements included in the coaxial optical system.

13. The image projection device according to claim 12, wherein
the projection optical system is an intermediate image system that forms a real image of the image forming element in between the coaxial optical system and the non-coaxial optical system.

14. The image projection device according to claim 12, wherein
a spacing between the image forming element and a lens being arranged at a position closest to the image forming element is fixed.

15. The image projection device according to claim 12, wherein,
when, for the first lens, a first refractive index at the center of the first lens is $N1_i$ and the first refractive index at the peripheral portion of the first lens is $N1_o$, and when, for the second lens, a second refractive index at the center of the second lens is $N2_i$ and the second refractive index at the peripheral portion of the second lens is $N2_o$, a sign of a first difference of the first refractive indices of the first lens $\Delta N_1 = N1_i - N1_o$ along the first direction from the center of the first lens to the peripheral portion of the first lens is equal to a sign of a second difference of the second refractive indices of the second lens $\Delta N_2 = N2_i - N2_o$ along the second direction from the center of the second lens to the peripheral portion of the second lens.

16. The image projection device according to claim 15, wherein
the first lens and the second lens are independently reciprocable in a direction along the optical axis so as to adjust a focal point of the image being projected on the surface, and
wherein the focal point of the image being projected on the surface is adjusted by changing a spacing of at least three optical elements included in the projection optical system, the at least three optical elements including the first lens, the second lens, and the curved-surface mirror.

17. The image projection device according to claim 16, wherein
the curved-surface mirror is a free-form surface mirror, and
wherein, when a horizontal direction of the surface is defined to be an X-axis direction and a vertical direction of the surface is defined to be a Y-axis direction, a curvature in the X-axis direction of the curved-surface mirror increases as a Y-axis coordinate value increases from a first Y-axis coordinate value corresponding to a first end portion of the curved-surface mirror, the first end portion being close to the optical axis of the coaxial optical system, to a second Y-axis coordinate value corresponding to a second end portion of the curved-surface mirror, the second end portion being separated from the optical axis of the coaxial optical system.

18. The image projection device according to claim 15, wherein,
when a first distance from a first point, at which a first outermost light beam among first light beams passing through the first lens exits the first lens, to the optical axis is $W_1$, and when a second distance from a second point, at which a second outermost light beam among second light beams passing through the second lens exits the second lens, to the optical axis is $W_2$, $(\Delta N_1/W_1)$ and $(\Delta N_2/W_2)$ are substantially equal.

19. The image projection device according to claim 12, wherein
a focal distance of the first lens and a focal distance of the second lens are substantially equal.

20. The image projection device according to claim 12, wherein
the first lens and the second lens are arranged adjacent to each other.

* * * * *